US010201263B2

(12) United States Patent
Stoyanov et al.

(10) Patent No.: US 10,201,263 B2
(45) Date of Patent: Feb. 12, 2019

(54) ADAPTIVE DOSING SYSTEM

(71) Applicant: CM2W JSC, Sofia (BG)

(72) Inventors: Vasil Stoyanov Stoyanov, Plovdiv (BG); Mihail Ivanov Yachev, Sofia (BG); Vladimir Veselinov Ninov, Sofia (BG); Yordan Pavlinov Simeonov, Sofia (BG)

(*) Notice: Subject to any disclaimer, the term of this patent is extended or adjusted under 35 U.S.C. 154(b) by 0 days.

(21) Appl. No.: 15/221,339

(22) Filed: Jul. 27, 2016

(65) Prior Publication Data
US 2017/0027410 A1   Feb. 2, 2017

(30) Foreign Application Priority Data
Jul. 29, 2015   (BG) .................................. 112065

(51) Int. Cl.
| A61M 31/00 | (2006.01) |
| A47L 15/44 | (2006.01) |
| A47L 15/00 | (2006.01) |
| D06F 39/02 | (2006.01) |
| A47J 31/40 | (2006.01) |
| D06F 39/00 | (2006.01) |

(52) U.S. Cl.
CPC .......... *A47L 15/449* (2013.01); *A47J 31/402* (2013.01); *A47L 15/0055* (2013.01); *A47L 15/0063* (2013.01); *D06F 39/02* (2013.01); *A47L 2401/023* (2013.01); *A47L 2501/07* (2013.01); *A47L 2501/26* (2013.01); *D06F 39/005* (2013.01)

(58) Field of Classification Search
CPC .......... A61M 5/172; A61M 2205/3592; A61M 5/142; A61M 2005/14208

USPC ........................................................... 604/67
See application file for complete search history.

(56) References Cited

U.S. PATENT DOCUMENTS

| 5,139,044 | A | * | 8/1992 | Otten .................... A01G 25/16 137/80 |
| 5,478,211 | A | * | 12/1995 | Dominiak ............. A61M 5/142 417/234 |
| 8,965,707 | B2 | * | 2/2015 | Blomquist ............. G06Q 50/22 702/19 |
| 9,049,821 | B1 | * | 6/2015 | Hanna .................... A01G 25/16 |

(Continued)

FOREIGN PATENT DOCUMENTS

| CA | 2524198 | 4/2006 |
| CN | 203672405 | 6/2014 |

(Continued)

OTHER PUBLICATIONS

Bulgarian search report, dated Jun. 10, 2015.

*Primary Examiner* — Phillip Gray
(74) *Attorney, Agent, or Firm* — Cionca IP Law P.C.; Marin Cionca

(57) ABSTRACT

An adaptive dosing system having a control module, a flow sensor unidirectionally connected to the control module for reporting a volume of a fluid passed through the system, a pump for dosing a required volume of the fluid and being uni-directionally connected to and controlled by the control module and a communication module bi-directionally connected with the control module, the communication module being configured to connect via Internet with an application server and a database server.

20 Claims, 7 Drawing Sheets

(56) References Cited

U.S. PATENT DOCUMENTS

2006/0089749 A1 4/2006 Arnold et al.
2015/0217054 A1* 8/2015 Booth ................ G06F 19/3468
                                                            604/504

FOREIGN PATENT DOCUMENTS

DE         102004036358        2/2006
EP              2497750       10/2013

* cited by examiner

ADAPTIVE DOSING SYSTEM

CROSS-REFERENCE TO RELATED APPLICATIONS

This application claims the benefit of Application for Patent No. 112065 filed on Jul. 29, 2015 with the Patent Office of Republic of Bulgaria, which is hereby incorporated by reference, to the extent that it is not conflicting with the present application.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF INVENTION

1. Field of the Invention

The invention relates generally to fluid dosing systems and processes and more particularly to adaptive dosing systems and processes that can be monitored and adjusted remotely to prevent problems before they occur.

2. Description of the Related Art

Various devices and systems providing adjustments for dosing processes and/or controlled release of a substance appear to be known. For example, a device for dosing and controlling the release of medicinal substances implanted in the patient and connected to an external device via radio frequency transponder appears to be known. The device appears to have a tank for containment of the substance, output opening for release of the substance and controllable driving and releasing. The specificity of the device appears to be that a chain for contactless communication with the external equipment is provided.

As another example, a system for precise fluid dosing appears to be known. The system appears to contain a control module with digital microcontroller with interface, emitting start signal and stop signal and interface for the received signals from a sensor unit. The system also appears to include a containment tank, as well as a dosing device for the distributed fluid. It seems that within the interval between the start signal and the stop signal certain quantity of liquid is released, and the sensor unit, effecting the start signal, continuously measures the fluid flow, supplied to the dosing device. The dosing process appears to be terminated, when the upfront set liquid quantity is delivered and a stop signal is sent to the dosing device.

The known systems for dosing or controlled release of substances however, do not appear to offer the configuration and functionality necessary for remote monitoring, control and adjustment of the dosing process, such that to enable an operator to carry out remote and real time monitoring, control and adjustment, by using a random computer or mobile device connected to the global network. Instead, currently, the user/operator needs to be located at or travel to the site of the dosing device. That can be expensive and time consuming and can lead to device down times and expensive repairs. Thus, there is a need for a new and improved dosing system and process that combines precision dosing with remote and real time monitoring, control and adjustment of the dosing process.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, an adaptive dosing system is provided, which includes a control module unidirectionally connected to sensors which report the quantity of fluid/preparation, passed through the system, peristaltic pumps pumping in the necessary quantity of fluid/preparation, which are unidirectionally linked with the control module, the control module being bi-directionally linked with a communication module, which, via the internet, is linked to a cloud application server, and through it, indirectly bi-directionally linked to a database server.

In another aspect, the control module, has an integrated or external feeding module and includes a microcontroller bi-directionally connected to a communication module, unidirectionally linked through a convertible connector with the sensors measuring the quantity of the fluid/preparation passed through the system, unidirectionally linked to galvanically insulated inputs and digital outputs, bi-directionally linked to a USB communication interface, an energy independent memory and a real time clock, and unidirectionally linked to a clock battery.

Thus, an advantage is the configuration and functionality necessary for remote monitoring, control and adjustment of the dosing process, such that to enable an operator or user to remotely monitor, control and adjust, by using a computer or mobile device connected to the internet. Another advantage is a new and improved dosing system and process that combines precision dosing with remote and real time monitoring, control and adjustment of the dosing process, thus preventing problems before they occur and improving operating efficiency and dosing efficacy.

The above aspects or examples and advantages, as well as other aspects or examples and advantages, will become apparent from the ensuing description and accompanying drawings.

BRIEF DESCRIPTION OF THE DRAWINGS

Elements in the figures have not necessarily been drawn to scale in order to enhance their clarity and improve understanding of these various elements and exemplary embodiments of the invention. Furthermore, elements that are known to be common and well understood to those in the industry are not depicted in order to provide a clear view of the various exemplary embodiments of the invention, thus the drawings are generalized in form in the interest of clarity and conciseness. For exemplification purposes, and not for limitation purposes, aspects, embodiments or examples of the invention are illustrated in the figures of the accompanying drawings, in which.

DETAILED DESCRIPTION

Figure 1:
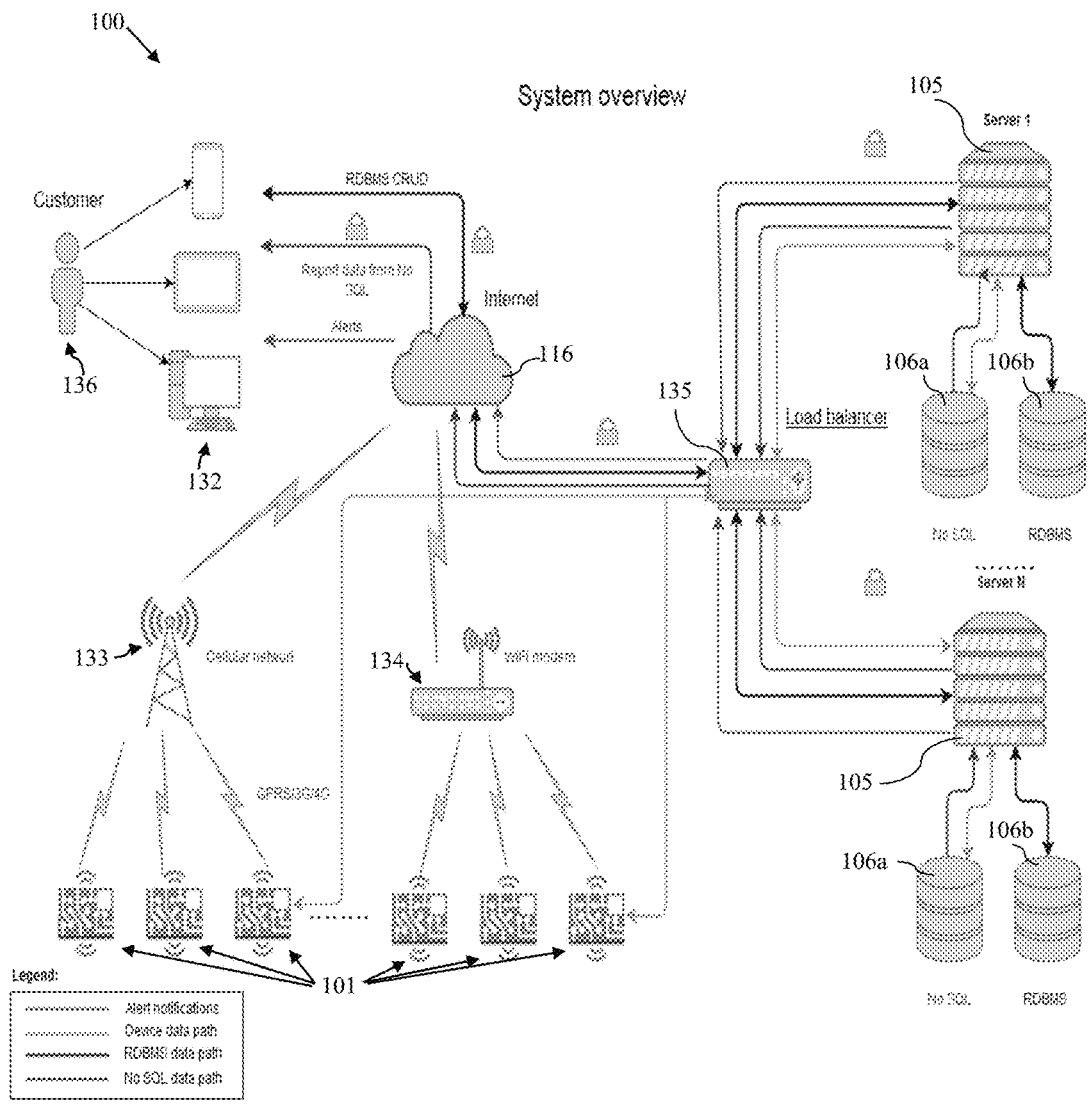
FIG. 1 illustrates a schematic diagram of an adaptive dosing system according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

As used herein and throughout this disclosure, the term "mobile device" refers to any electronic device capable of communicating across a mobile network. A mobile device may have a processor, a memory, a transceiver, an input, and an output. Examples of such devices include smartphones, tablet computers, etc. The memory stores applications, software, or logic. Examples of processors are computer processors (processing units), microprocessors, digital signal processors, controllers and microcontrollers, etc.

"Logic" as used herein and throughout this disclosure, refers to any information having the form of instruction signals and/or data that may be applied to direct the operation of a processor. Logic may be formed from signals stored in a device memory. Software is one example of such logic.

For the following description, it can be assumed that most correspondingly labeled elements across the figures (e.g., 101 and 401, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

Figure 4:
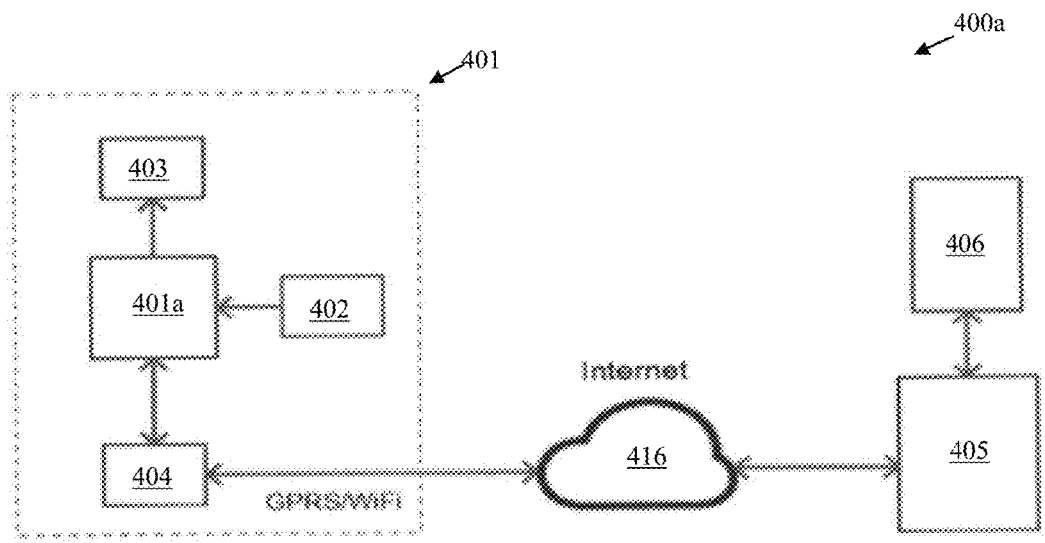
FIG. 4 illustrates a simplified block diagram of an adaptive dosing system according to an aspect.
Figure 5:
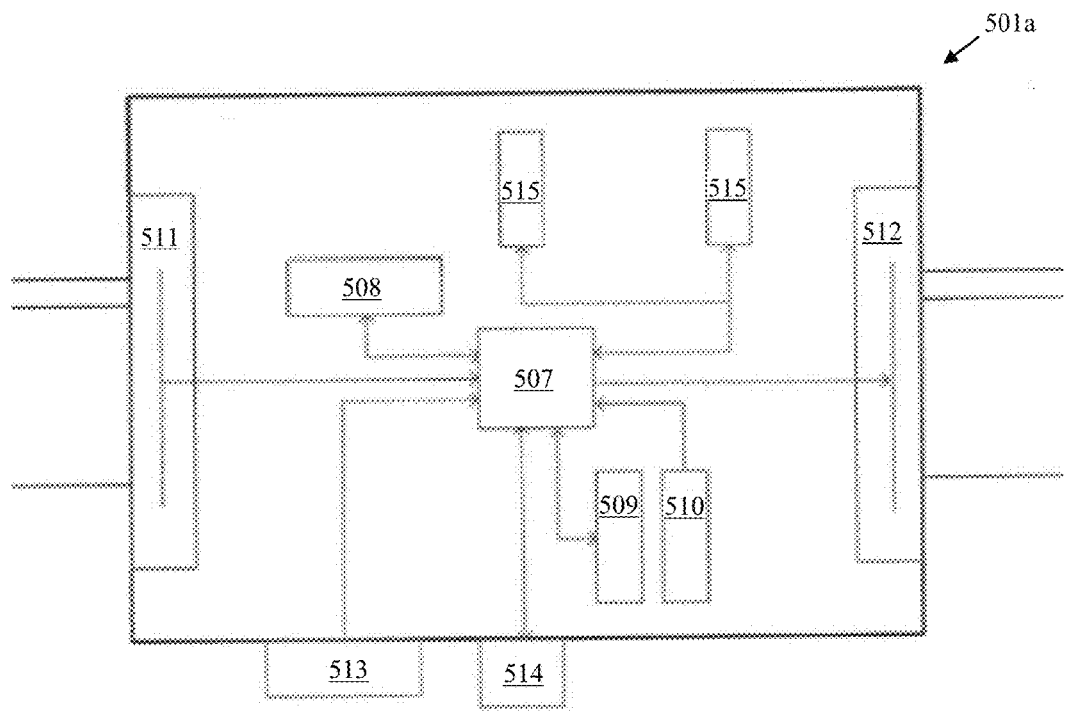
FIG. 5 illustrates a block diagram of a dosing control module according to an aspect.

Referring now to FIGS. 1 and 4-5, again, FIG. 1 illustrates a schematic diagram of an adaptive dosing system according to an aspect, FIG. 4 illustrates a simplified block diagram of an adaptive dosing system according to an aspect and FIG. 5 illustrates a block diagram of an dosing control module, according to an aspect. Again, the adaptive dosage system 100, 400a, which can be used for professional washing, dishwashing, vending, coffee machines and the like, and which preferably has constant connectivity to internet 116, 416, may include one or more adaptive dosing controllers 101, 401, which may have a dosing control module 401a, a communication module 404, sensor(s) 402 and/or a sensor module (see 202a in FIG. 2), and pump(s) 403 with actuators (not shown). The control module 401a (501a in FIG. 5) may have an integrated or external feeding module (i.e., 513 in FIG. 5), whereto uni-directionally sensors 402 (202 in FIG. 2) may be linked, reading the quantity of passed fluid or preparation through the system. As shown, the control module 401a may also be uni-directionally linked to pumps 403 ((203 in FIG. 2), which may be peristaltic pumps.

In addition, the control module 401a may be also bi-directionally linked to a communication module 404 (204 in FIG. 2), which via internet 116, 416 may provide bi-directional connection with one or more cloud application servers 105, 405, and also via it, indirect bi-directional connection to one or more database servers 106a-b, 406.

The dosing control module 401a, 501a may include a micro-controller 507, which may have a bi-directional connection with a communication module 404 via connectors 515 and uni-directional connection through convertible connector 513 for a galvanically insulated connection with sensor(s) 402 for reading the fluid passed through the system. Further, the microcontroller 507 may be uni-directionally connected with the galvanically insulated digital inputs 511 (which can be used for reading digital signals from different kind of sources, such as valves, power supply (On/Off), signals from encoders, signals from laundry machine or dishwasher machine, etc.) and with the galvanically insulated digital outputs 512 (which can be used for driving pumps, alarm lamps, buzzers, valves etc.). The micro-controller 507 may also have bi-directional connection with energy independent memory 508 and bi-directional connection with a real time clock 509, as well as with a communication interface 514 (e.g., USB). For servicing the real time clock work, the micro-controller 507 may be connected to a battery 510. It should be understood that galvanically insulated connections are preferred as they are the standard in the industry.

As described, hereinbefore, the sensors 402, reading the fluid passed through the system may be flow meters/sensors of various types and work principles, disposing with digital output. The sensors 402 may also be temperature and/or pressure sensors (see 202 in FIG. 2), and/or other suitable sensors.

During the operation of the adaptive dosing system 100, 400a, the pump(s) 403 do the pumping of the fluid into, for example, professional washing and dishwashing machines. The pumps 403 may have uni-directional connection with the galvanically insulated outputs 512 of the control module 501a, so that the control module 501a can control the operation of the pumps 403.

The number of the galvanically insulated digital intputs 511 and accordingly of the galvanically insulated outputs 512 are preferably at least 2 and not more than 12.

The communication module 404 may include a WiFi modem and/or a GPRS modem, based on 2G/3G standard for data transfer through the networks of mobile operators.

The communication module 404 may be bi-directionally linked via connectors to the control module 401a, and the transmission of information may be done by synchronous or a-synchronous serial interface to the microcontroller 507.

In an example, the reported indicators from sensors 402 are transmitted via the communication module 404 and internet 116, 416 to a cloud application server 105, 405, and from there they are stored in a database server 106a-b, 406. The microcontroller 507 uses actively the real time clock 509 so that the reported readings of the sensors 402 contain detailed information about the time of their measuring.

The algorithms for work of the adaptive dosing system 100, 400a are set in the form of programs. In an example, the programs may be provided to control module 401a, 501a by the cloud application server(s) 105, 405 via internet and the communication module 404. The programs define the sequence of actions and outputs activations the dosing controller 101, 401 produces upon receipt of an input signal sequence on insulated digital inputs 511. The programs define the behavior of the dosing controller depending on certain input conditions, e.g., signals on insulated digital inputs (e.g., from valves, power supply—On/Off, signals from encoders, signals from laundry machine, dishwasher machine, signals from the electric motors—switched on/off, etc.) and information from the sensors.

Figure 10:
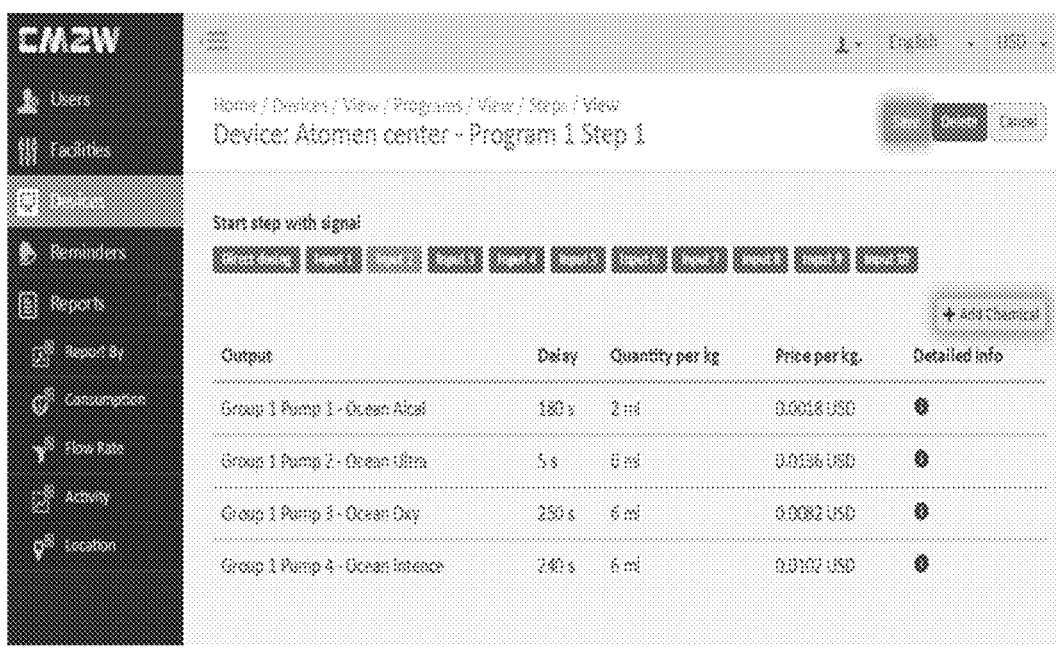
FIG. 10 illustrates an example of step of a program which can be executed by the adaptive dosing controller.

On the basis of the information, entered to the galvanically insulated inputs 511, the microcontroller 507 recognizes and determines which program shall be started, in the event the program has not been started yet. Referring to FIG. 10, it can be noted a simple step of a program. The step is a sequence of actions which are executed upon receipt of a particular sequence of input influences/signals. The program itself is a sequence of steps.

The control module 501a may have a communication interface 514, whereby the dosing system can be controlled and configured. This may be an option to be used for example for local configuration or when the Internet is down. Otherwise, as described herein, the adaptive dosing system is remotely controllable via the Internet.

Thus, the adaptive dosing system 100 is configured to remotely monitor and control the dosing process of a fluid medium via a permanent connection to internet. To accomplish the remote control and monitoring, the adaptive dosing system 100 comprises the dosing controllers 101, 401 with internet connection via wired (not shown) or wireless connection using for example WiFi/GPRS/3G/4G modules (204 in FIG. 2) and WiFi modem(s) 134 and/or cellular network (s) 133, as well as servers 105 with relational 106b and No SQL 106a databases for each server instance, a load balancer 135 and platform independent client application. The platform independent client application makes the dosing system versatile by allowing customers to use the client application on various devices (e.g., PC, tablet, smart phones, etc.) and operating systems (Windows, Mac OS, iOS, Android, Linux, Unix).

The client application prepares and sends dosing settings entered by a user 136 via a remote, internet connected user device 132 to a dosing controller 101. Each dosing controller 101 may monitor and control a single or multiple dispensers. As described in more detail hereinafter when referring to FIG. 2, a high-precision flow sensor, and/or other sensors 202, may be inserted in the fluid path 223 of the existing dispensers. The dosing controller 101, 401 start dosing depending on the operational parameters of the dosing process and continuously monitors and measures the dispensed quantity and flow rate of the fluid, and/or temperature or pressure of the fluid. The dosing controller 101 may be configured to stop the dosing when the required quantity of the fluid is reached. The dispensed quantity/volume of the fluid is preferably a function of the count of pulses (digital signals) from a flow sensor. The best accuracy could be achieved using additional self-calibration procedure. The self-calibration procedure calculates calibration factor which reduces the error between measured and calculated fluid volume. The self-calibration procedure includes: 1. Start pump for 60 sec. 2. Measure the volume of fluid. This can be done by operator, using for example a volume measuring tube. This is typically done only once, during the installation. 3. Controller calculates the volume of fluid, based on the counted pulses from the flow meter/sensor. 4. Controller calculates/generates, stores and uses a calibration factor $F=Vm/Vc$, where Vm is measured volume of fluid, and Vc is calculated volume of fluid. The calibration procedure is per pump/fluid. This is an important procedure, included preferably in all adaptive dosing controllers. This self-calibration procedure provides superior accuracy to the dosing system and process disclosed herein. By contrast, others do dosing by time for instance; they calibrate their pumps measuring the time for which the pump will fill a measurement tube with volume of 100 ml; this is highly inaccurate due to human error factor.

All the time, the dosing controller(s) 101, 401 may be configured to register and store in an internal storage 508 the data related to the dosing process. Further, when the dosing process has finished, the dosing controller 101, 401 may send the data to certain server of the system depending on the load balancer 135 input. At any time, the users/customers 136 have remote access to the registered data to analyze and remotely optimize the dosing process (e.g., by changing dosing settings, etc), without the need to travel to the actual site of the dosing controllers 101, 401.

Figure 2:
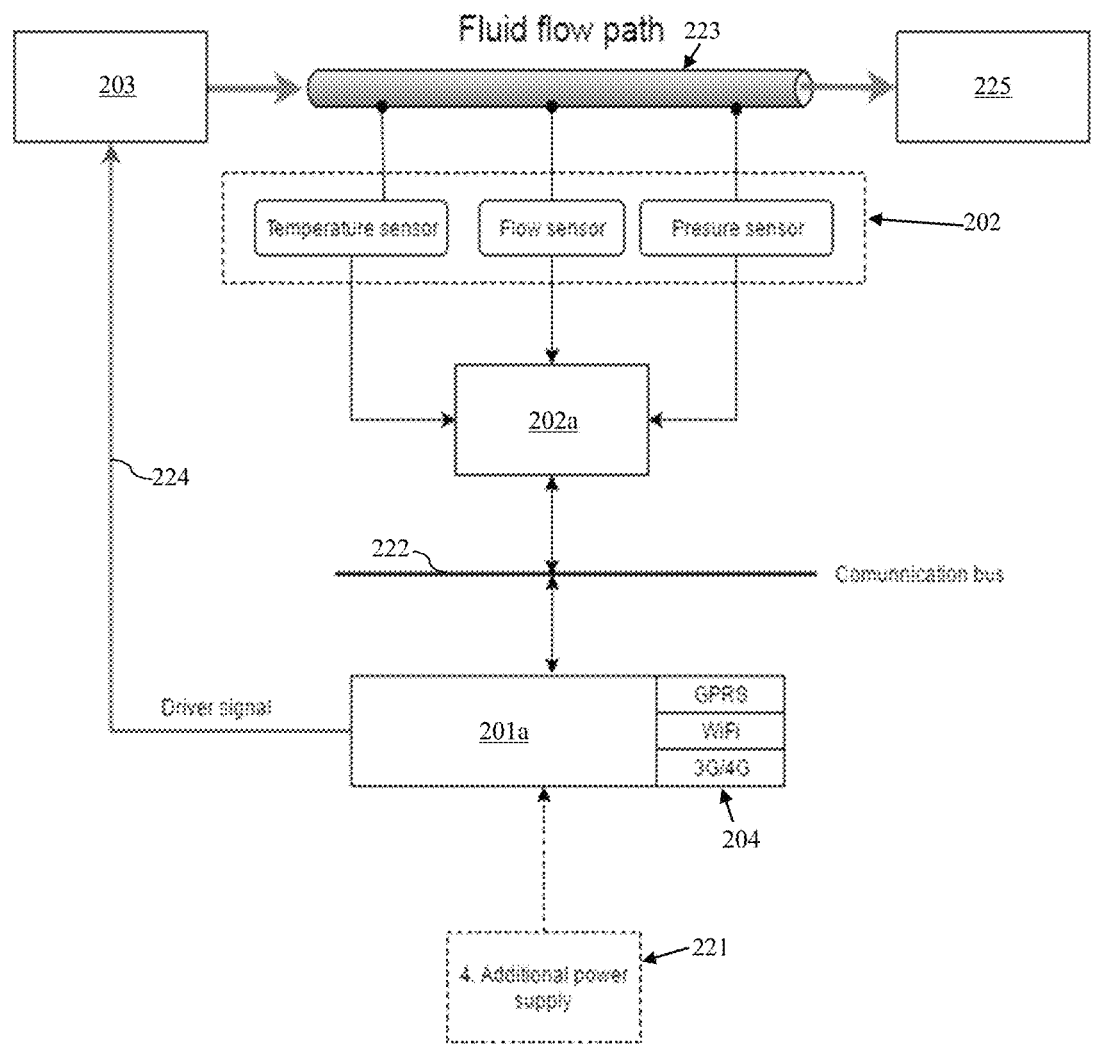
FIG. 2 is a block diagram depicting an example of operational configuration of an adaptive dosing controller, according to an aspect.

FIG. 2 is a block diagram depicting an example of operational configuration of an adaptive dosing controller, according to an aspect.

As shown in FIG. 2, the adaptive dosing controller may be configured to observe and measure one or more operational parameters (e.g., flow rate, temperature, pressure, etc) of a particular dosing process via input(s) from different kind of sensors 202, corresponding with the operational parameters that need to be monitored. In an example, the adaptive dosing controller may use transducers/sensors 202 to observe and measure operational parameters of fluid dosage through fluid flow path 223, by pump 203. The control module 201a of the adaptive dosing controller may gather information about the operational parameters of fluid dosage using a sensor module 202a. Sensor module 202a may be configured to gather data from sensors 202, and process and send the data to the control module 201a using for example a common communication bus 222. In industrial application fields, the common communication bus 222 is based on RS485 standard which is appropriate in electrically noisy environments.

Based on the information received about the operational parameters of fluid dosage, the control module 201a may be configured to generate all the time an appropriate driving signal to pump 203. For example, when flow rate is lower than expected, the period for which the power is applied increases in order to achieve the required fluid volume;

when flow rate is too high, then the period for which the power is applied decreases in order to achieve the required fluid volume; when temperature is too high/low, then appropriate factor (from predefined tables) is applied to achieve the required fluid volume and increase the accuracy; when pressure is too high/low, then appropriate factor (from predefined tables) is applied to achieve the required fluid volume and increase the accuracy.

Depending on the type of pump 203 and power consumption of the pump 203 an additional power supply 221 may be provided.

When the desired volume of dispensed fluid is reached, the control module 201a can interrupt the driving signal 224 to pump 203.

In a preferred embodiment, all the time, the adaptive dosing controller has persistent connection to internet in order to allow for remote control and monitor of the dosing process. The persistent connection to internet is an aspect that makes the adaptive dosing system different and better than the prior art as it allows remote control (e.g., settings entry) and monitoring (e.g., flow rate in real time) of the dosing process by users, owners and/or operators. Further, in an aspect, the adaptive dosing system 100, 400a (via adaptive dosing controller 201, 401 and/or application server 105, 405) may be configured to generate and send alarm notifications to remote monitoring site(s) based on the measured operational parameters of the dosing process. This way, problems may be prevented before they occur. For example, when the flow rate gets down more than 30%, the tubing of pump likely must be replaced or the pump will stop feeding fluid to the laundry/dishwasher machines; when the volume of certain chemical gets down the specified limit, an alarm notification will be sent—must deliver chemical/detergent; when the valves check fails, then an urgent alarm notification will be sent and the dosing process will be stopped. In an example, the dosing process could be terminated by the dosing controller if for a predetermined period of time the predetermined amount of fluid has not been delivered. In this case an alarm notification may be send to the remote monitoring site to prevent problems related to the dosing process.

The adaptive dosing controller 201 is modular with regards to communication module 204 and sensors module 202a. This way, the adaptive dosing controller 201 can work in different type of working environments, e.g., use WiFi where there is no GSM network coverage, or use GPRS/3G/4G depending on the mobile network providers, or use different type of sensors to measure the operational parameters of the laundry/dishwasher machines, etc.

Figure 3A:
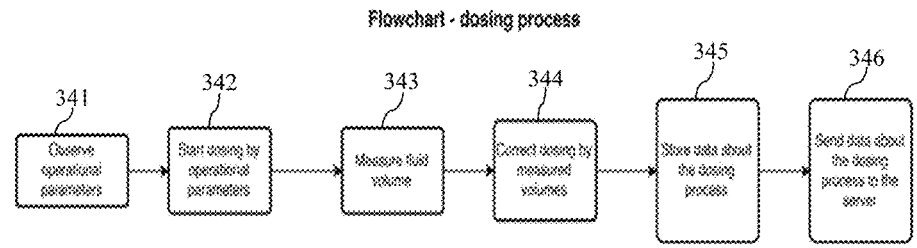
FIG. 3a is a simplified flow diagram depicting an adaptive dosing process according to an aspect.

FIG. 3a is a simplified flow diagram depicting an adaptive dosing process according to an aspect. First, as shown as step 341, the operational parameters (e.g., preparation formula, input sequence of digital signals, flow rate, dosing volume, alert type, etc), as set by a user through the dosing application interface (see FIGS. 6-10 as examples) are observed by the adaptive dosing system 100. Next, the adaptive dosing system 100 starts dosing (step 342) according to the operational parameters. This may be accomplished by control module 201a sending a driver signal to pump(s) 203. During dosing, the sensor(s) 202 measure for example the volume of dispensed fluid or preparation. If a discrepancy is detected (e.g., a lower volume per time unit is dispensed than as expected, according to operational parameters), in step 344 the dosing controller may be configured to automatically correct the dosing (e.g., by increasing the driver signal 224 to pump 203). If the discrepancy or error cannot be automatically corrected, the dosing process may be stopped and an alarm may be sent to the client/user/operator.

Next, in step 345, the data about the dosing process may be stored, and sent (step 346) to the server, where it is accessible, in real time or later, by the user/client/operator for analysis and assistance in adjusting operational parameters.

Figure 3B:
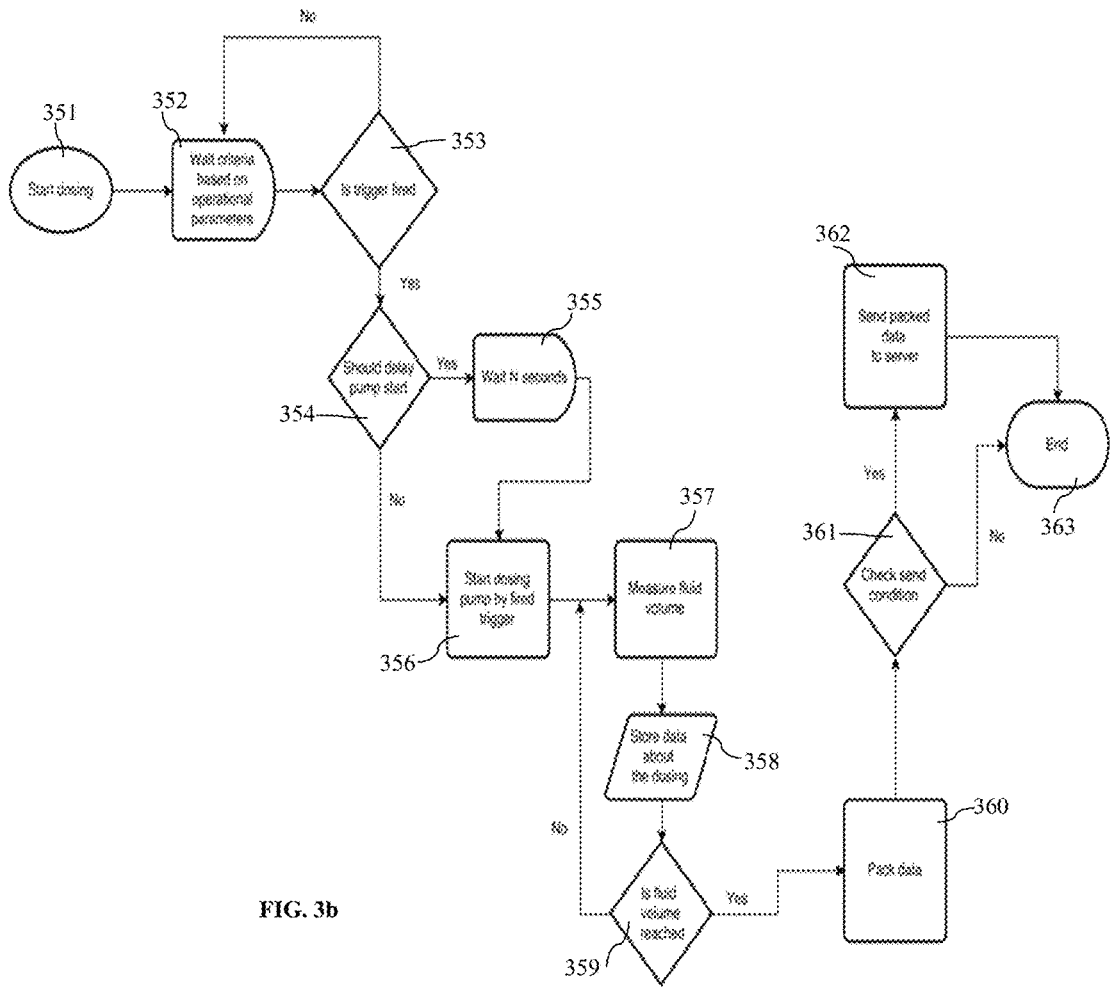
FIG. 3b is another, more detailed, flow diagram depicting an adaptive dosing process according to an aspect.

FIG. 3b is another, more detailed, flow diagram depicting an adaptive dosing process, according to an aspect. After program start (step 351), the control module 201a, 401a of the adaptive dosing controller 101, 401 is preferably configured to wait for event(s) which trigger(s) some action(s) (e.g., event—received signal on insulated digital input 2, then the action is—pump start running). When some event happens, (which controller 101, 401 monitors for), a trigger may be fired (step 353), i.e., action/sequence of actions will be executed. Before the action(s) is/are executed, the program may introduce a preset time period (delay), steps 352, 354-355, to wait for before the dosing process starts in step 356. The preset delay is set as time period in seconds, by the client application (see FIG. 10, "Delay" column, which contains delay periods). The delay is very important with regards to chemicals supplied to the dishwasher/laundry machine, or other similar machines. The introduction of a delay may prevent mixture of incompatible chemicals. Referring to FIG. 10, pump 2 starts in 5 s., after the reception of an active signal on Input 2 and pump 3 starts in 250 s, after the reception of an active signal on Input 2. This prevents the mixture of chemicals introduced by pump 2 and pump 3.

In delay state the adaptive dosing controller 101, 401 just waits for N seconds before starting pump 203 in step 356. When the pump 203 is started, the adaptive dosing controller 101, 401 measures all the time fluid volume of the chemicals (step 357). The adaptive dosing controller 101, 401 preferably stores the data (step 358) related to the dosing process in an internal storage 508. When the dosing process is completed, step 359, the adaptive dosing controller 101, 401 preferably packs the data (step 360) and sends the data (steps 361-362) about the dosing process to the server 105, before the program ends (363).

Figure 6:
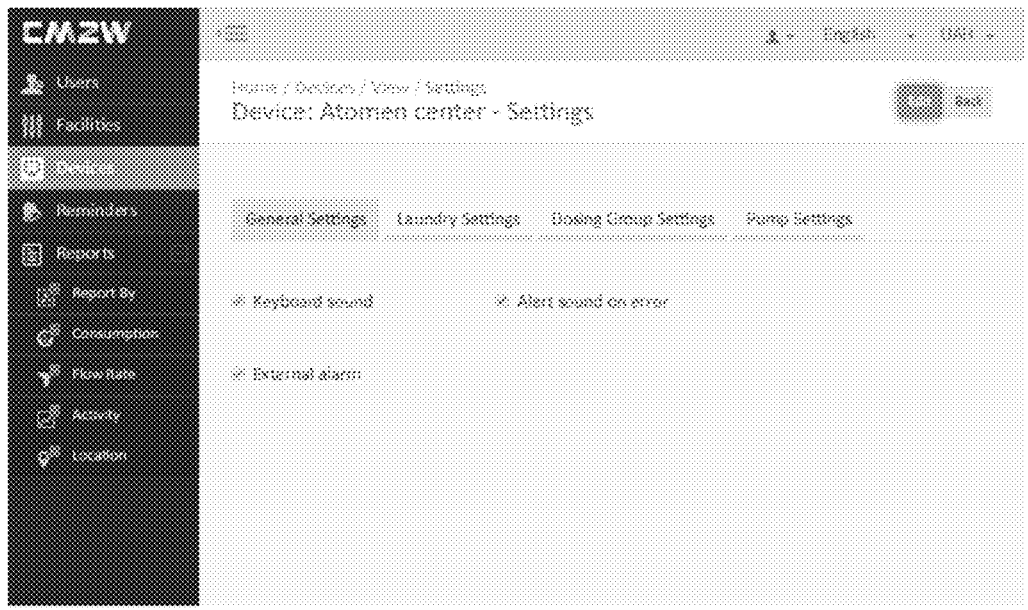
FIG. 6 illustrates an example of user interface of an application configured to control the adaptive dosing system and process, related to general settings of an adaptive dosing controller.

Again, FIGS. 6-10 are given as example of user interfaces and dosing settings that may be available through the dosing application/logic/software. FIG. 6 illustrates an example of user interface of an application configured to control the adaptive dosing system and process, related to general settings of an adaptive dosing controller. As shown, for example, a user can set here whether or not an alarm will be switched on when the adaptive dosing system 100 detects an error in the dosing process. As suggested, the alarm may be an external alarm, light and/or sound based for example, which notifies the staff to pay attention because something wrong happened about the dosing process.

Figure 7:
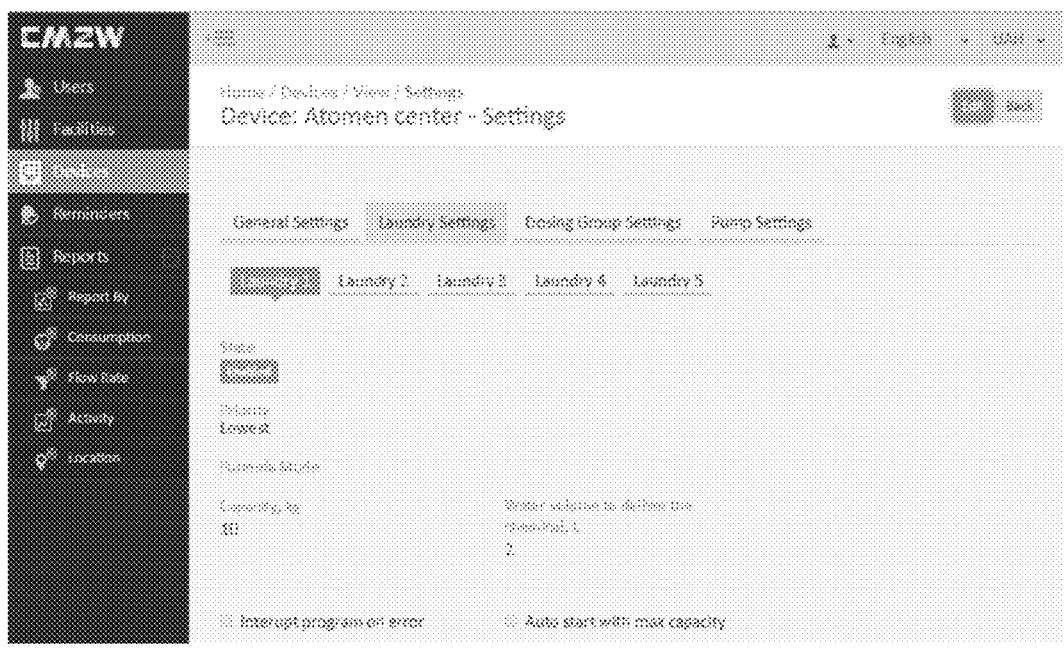
FIG. 7 illustrates an example of user interface of an application configured to control the adaptive dosing system and process, related to laundry settings of an adaptive dosing controller.

FIG. 7 illustrates an example of user interface of an application configured to control the adaptive dosing system and process, related to laundry settings of an adaptive dosing controller. The settings in this example are related to the laundry machines which are controlled and monitored by the adaptive dosing system. "State"—Enabled/Disabled—defines whether the laundry machine can be controlled and monitored by the adaptive dosing controller. "Priority" may be High/Middle/Low/Lowest. The adaptive dosing controller 101, 401 can for example serve up to 10 (ten) laundry machines. In case of concurrent requests from laundry machines to adaptive dosing controller, some of the laundry machines could request the urgent service compared to all other machines. Priority defines which requests (from which laundry machines) will be served first—the higher the priority, the faster it will be served. "Water volume to deliver the chemical" setting considers that the adaptive dosing controller could deliver chemicals using common pipeline, and some water is used to deliver the chemical(s) to certain laundry machine. By checking, "Interrupt program on error" box, the dosing process will stop in the event the error is registered by the adaptive dosing controller, as described hereinbefore. "Autostart with max capacity" considers the situation when the capacity/volume of laundry in the laundry machine is less than full capacity/volume; then, the adaptive dosing controller may re-calculate the dosage of chemicals according to the loaded capacity/volume. If the customer does not want such a re-calculation of the dosage of the chemicals to occur, then it must set this flag.

Figures 8, 9:
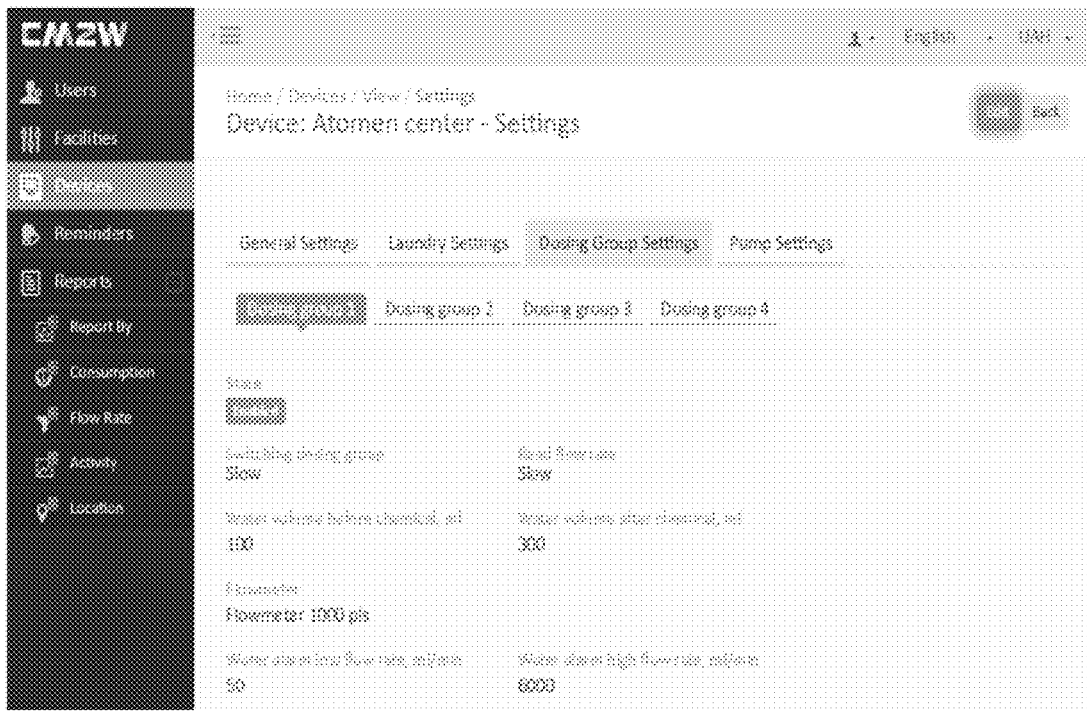
FIG. 8 illustrates an example of user interface of an application configured to control the adaptive dosing system and process, related to dosing group settings of an adaptive dosing controller.
FIG. 9 illustrates an example of user interface of an application configured to control the adaptive dosing system and process, related to pump settings of an adaptive dosing controller.

FIG. 8 illustrates an example of user interface of an application configured to control the adaptive dosing system and process, related to dosing group settings of an adaptive dosing controller. Preferably, the dosing pumps are grouped in dosing groups. Then each dosing group may be configured to dose compatible chemicals. This is important as incompatible chemicals must be dosed by different dosing groups. Dosing group can be enabled or disabled. Adaptive dosing controller can switch between dosing groups. "Slow/Normal/Fast" setting refers to the fact that each dosing group has a flow meter which measures the volume of the respective fluid (chemical or water). The reading of data from flow meter/sensor can be Fast/Normal/Slow. This sets the period during which data is read by the sensor—flow meter. For example, in case the chemical has very high viscosity index the reading of data must be "Slow." This parameter depends on the viscosity index of the chemical.

As suggested in this example, before and after each dosing of a chemical, additional volume of water can be applied in order to clean the pipeline and to achieve long life of the system. As also suggested in this figure, the application can set the water low and high flow rates that will generate an alarm.

FIG. 9 illustrates an example of user interface of an application configured to control the adaptive dosing system and process, related to pump settings of an adaptive dosing controller. As suggested in this figure, the adaptive dosing application may be configured to allow control of several pumps, indicate the chemical/preparation to be dispensed by each pump, and the low and high flow rates that will generate an alarm.

FIG. 10 illustrates an example of step of a program which can be executed by the adaptive dosing controller. Each program is composed by sequence of steps. The step is a sequence of actions which are executed upon receipt of a particular sequence of input influences/signals. When the step is activated (as is illustrated in FIG. 10 by Input 2) certain pumps are started—immediately or in some delay and each pump should introduce the preset amount of chemical/preparation.)

Thus, it should be understood that the adaptive dosing system disclosed herein has at least the following advantages:

Continuous detailed tracing of the dosing process;

Maintenance of constant quantity of the passed fluid/preparation through the system and ensuring high quality services;

Remote monitoring, configuration and control of the dosing system, reducing significantly the running costs for maintenance of such type of systems;

Automatic correction of dosing error(s) detected;

Generation of alarms in case of deviation from the set dosing parameters;

Recognition of the working regimes of professional washing and dish washing machines, or other similar machines, and choice of the most suitable operational regime of the adaptive dosing system, which guarantees high quality services.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. An adaptive dosing system comprising:
   a control module;
   a flow sensor uni-directionally connected to the control module for reporting a volume of a fluid passed through the system;
   at least a pump for dosing a required volume of the fluid and being uni-directionally connected to and controlled by the control module;
   a communication module bi-directionally connected with the control module, the communication module being configured to connect via Internet with an application server and a database server;
   wherein the control module is configured to allow remote control and configuration via the Internet by receiving and executing dosing instructions from the application server based on operational parameters set by a user via a client application;
   wherein the control module is monitors the dosing and, when a deviation from the operational parameters is detected by the control module, the control module automatically corrects the dosing by causing an adjustment to the dosing while the dosing is in progress without stopping the at least a pump;
   wherein, when the deviation causes an uncorrectable dosing error, the control module further automatically interrupts the dosing by stopping the at least a pump; and
   wherein, when the at least a pump is automatically interrupted due to the uncorrectable dosing error, the control module sends an alert to a user device via the Internet.

2. The adaptive dosing system of claim 1, wherein the control module comprises:
   a microcontroller which is bi-directionally connected to a plurality of connectors for connection with the communication module;
   a convertible connector, which is uni-directionally linked to the microcontroller, and which is configured for connection with the flow sensor;
   a plurality of inputs and a plurality of outputs uni-directionally linked to the microcontroller;
   an energy independent memory, which is bi-directionally linked to the microcontroller;
   a real time clock, which is bi-directionally linked to the microcontroller, and which is configured to provide to the microcontroller information about a time of the reporting by the flow sensor; and
   a clock battery, which is uni-directionally linked to the microcontroller.

3. The adaptive dosing system of claim 2, wherein the control module further comprises a communication interface whereby the adaptive dosing system can be locally controlled and configured.

4. The adaptive dosing system of claim 1, wherein the control module is configured to control a plurality of pumps, and wherein for each pump of the plurality of pumps a chemically unique fluid to dispense and a unique start delay can be set by the user via the client application, such that to prevent a mixing of incompatible fluids.

5. The adaptive dosing system of claim 1, wherein, for increased accuracy, the flow sensor is configured to observe a period of time during which a flow data is read, the period of time being set via the client application by the user, based on a viscosity index of the fluid.

6. The adaptive dosing system of claim 1, wherein the control module is configured to control a plurality of pumps, and wherein for each pump of the plurality of pumps a unique acceptable flow rate range can be set by the user via the client application, thus causing the system to generate an alarm anytime a deviation from the set flow rate range is detected.

7. The adaptive dosing system of claim 1, wherein the control module is configured to monitor the dosing and report the data to the database server for viewing and analysis by the user.

8. The adaptive dosing system of claim 1, further comprising a temperature sensor or a pressure sensor to provide temperature data or pressure data to the control module, which is configured to apply an appropriate temperature factor or an appropriate pressure factor, in order to dose the required fluid volume with increased accuracy.

9. The adaptive dosing system of claim 1, wherein the at least a pump is a peristaltic pump.

10. The adaptive dosing system of claim 1, wherein the reported volume of the fluid passed through the system is a function of a count of pulses from the flow sensor.

11. The adaptive dosing system of claim 10, wherein, for increased accuracy, the control module is configured to apply a calibration factor before reporting the volume of fluid passed through the system, the calibration factor being determined by dividing a measured volume of fluid passed through the system in a set amount of time using a volume measuring tube, by a volume calculated by the control module based on a number of pulses received from the flow sensor during the same time.

12. The adaptive dosing system of claim 2, wherein the plurality of inputs and the plurality of outputs are both between 2 and 12.

13. An adaptive dosing system comprising:
   a control module;
   a flow sensor unidirectionally connected to the control module for reporting a volume of a fluid passed through the system;
   at least a pump for dosing a required volume of the fluid and being uni-directionally connected to and controlled by the control module;
   a communication module bi-directionally connected with the control module, the communication module being configured to connect via Internet with an application server and a database server;
   wherein the reported volume of the fluid passed through the system is a function of a count of pulses from the flow sensor; and wherein, for increased accuracy, the control module is configured to apply a calibration factor before reporting the volume of fluid passed through the system, the calibration factor being determined by dividing a measured volume of fluid passed through the system in a set amount of time using a volume measuring tube, by a volume calculated by the control module based on a number of pulses received from the flow sensor during the same time.

14. The adaptive dosing system of claim 13, wherein the control module is configured to allow remote control and configuration via the Internet by receiving and executing dosing instructions from the application server based on operational parameters set by a user via a client application.

15. The adaptive dosing system of claim 13, wherein the control module is configured to automatically correct the dosing while the dosing is in progress, when a deviation from the operational parameters is detected by the control module.

16. The adaptive dosing system of claim 13, wherein the control module is configured to monitor the dosing, interrupt the dosing if the deviation causes an uncorrectable error and send an alert to a user device via the Internet.

17. The adaptive dosing system of claim 13, further comprising a temperature sensor and a pressure sensor to provide temperature data or pressure data to the control module, which is configured to apply an appropriate temperature factor or an appropriate pressure factor, in order to dose the required fluid volume with increased accuracy.

18. The adaptive dosing system of claim 1, wherein the control module is configured to automatically correct the dosing by adjusting a driver signal to the at least a pump, while the dosing is in progress.

19. The adaptive dosing system of claim 18, wherein the control module is configured to automatically correct the dosing by increasing a period for which the driver signal is applied to the at least a pump, while the dosing is in progress, if a lower volume per time unit than as set via the client application is dispensed by the at least a pump.

20. An adaptive dosing system comprising:
a control module;
a flow sensor uni-directionally connected to the control module for reporting a volume of a fluid passed through the system;
at least a pump for dosing a required volume of the fluid and being uni-directionally connected to and controlled by the control module;
a communication module bi-directionally connected with the control module, the communication module being configured to connect via Internet with an application server and a database server;
wherein the control module is configured to allow remote control and configuration via the Internet by receiving and executing dosing instructions from the application server based on operational parameters set by a user via a client application;
wherein the control module is configured to monitor the dosing and to automatically correct the dosing while the dosing is in progress, when a deviation from the operational parameters is detected by the control module;
wherein the control module is further configured to interrupt the dosing if the deviation causes an uncorrectable dosing error and to send an alert to a user device via the Internet;
wherein the reported volume of the fluid passed through the system is a function of a count of pulses from the flow sensor; and
wherein, for increased accuracy, the control module is configured to apply a calibration factor before reporting the volume of fluid passed through the system, the calibration factor being determined by dividing a measured volume of fluid passed through the system in a set amount of time using a volume measuring tube, by a volume calculated by the control module based on a number of pulses received from the flow sensor during the same time.

* * * * *